United States Patent [19]

Gliemeroth et al.

[11] Patent Number: 4,566,987

[45] Date of Patent: Jan. 28, 1986

[54] SCINTILLATION GLASS

[75] Inventors: Georg Gliemeroth, Mainz-Finthen; Burkhard Speit, Mainz-Mombach; Hans-Georg Krolla, Mainz, all of Fed. Rep. of Germany

[73] Assignee: Schott-Glaswerke, Mainz, Fed. Rep. of Germany

[21] Appl. No.: 504,906

[22] Filed: Jun. 16, 1983

[30] Foreign Application Priority Data

Jun. 16, 1982 [DE] Fed. Rep. of Germany ....... 3222567

[51] Int. Cl.$^4$ ................. C09K 11/463; C09K 11/475; C03C 3/10
[52] U.S. Cl. ...................... 252/301.4 F; 252/301.4 P; 252/301.4 R; 252/301.6 P; 252/301.6 F
[58] Field of Search .................. 252/301.4 R, 301.4 P, 252/301.4 F, 301.6 P, 301.6 F; 501/63, 64, 73, 78

[56] References Cited

U.S. PATENT DOCUMENTS

| 3,032,428 | 5/1962 | Ginther | 106/47 |
| 3,052,637 | 9/1962 | Bishay | 252/301.4 |
| 3,097,172 | 7/1963 | Ginther | 252/301.4 |
| 3,467,534 | 9/1969 | MacDowell | 501/64 X |
| 3,984,587 | 10/1976 | Lipp | 427/70 |

FOREIGN PATENT DOCUMENTS

| 44-14826 | 7/1969 | Japan . | |
| 52-30289 | 8/1977 | Japan . | |
| 52-95715 | 8/1977 | Japan . | |
| 572771 | 10/1945 | United Kingdom | 252/301.4 F |
| 869055 | 5/1961 | United Kingdom . | |
| 905391 | 9/1962 | United Kingdom . | |
| 565893 | 7/1977 | U.S.S.R. . | |

Primary Examiner—Howard S. Williams
Attorney, Agent, or Firm—Millen & White

[57] ABSTRACT

A colorless, cerium-and phosphorous-containing barium silicate glass, with a density of >3.3 g/cm$^2$, a radiation length <43.5 mm, with strong fluorescence at 415–430 nm and with good scintillation properties, consisting essentially of (in percent by weight):

| | | |
|---|---|---|
| $SiO_2$ | 20–60 | ⎫ |
| $B_2O_3$ | 0–18 | ⎬ - 21–60 |
| $P_2O_5$ | 1–10 | ⎭ |
| $Li_2O$ | 0–10 | |
| $Na_2O$ | 0–10 | |
| $K_2O$ | 0–15 | |
| $MgO$ | 0–10 | |
| $SrO$ | 0–12 | |
| $BaO$ | 30–60 | ⎫ |
| | | ⎬ - 30–60 |
| $La_2O_3$ | 0–10 | ⎭ |
| $Ce_2O_3$ | 0.5–8 | |
| Other oxides | 0–20 | |
| $Al_2O_3$ | 0–2 | |
| $CaO$ | 0–4 | |

9 Claims, No Drawings

SCINTILLATION GLASS

BACKGROUND OF THE INVENTION

The present invention relates to glasses which have the capacity of scintillating when subjected to nuclear, neutron or gamma radiation.

Scintillators are finding ever increasing applications in nuclear physics, particularly for the purposes of detecting and/or identifying high speed particles. The material through which the high speed particles travel is stimulated. This causes the kinetic energy of the particles to be stepwise transmitted to the molecules of the material. It is then emitted in the form of light.

In addition to ZnS or NaI crystals, glass may also be used as a scintillation material or scintillation counter. Moreover, it has the special advantage that it can be produced substantially more cheaply and in any conceivable form and size. Glasses of this type have been known for some time, for example from GB-PS 869,055, U.S. Pat. Nos. 3,052,637, 3,097,172, GP-PS 905,391, U.S. Pat. No. 3,032,428, SU-PS 565,893, JP-OS 44-14 826, JP-OS 52-957 15, JP-OS 52-957 15, JP-OS 52-30289 and JP-OS 81-05344.

However, SU-PS 565,893 describes a radio-thermoluminescent material, i.e., not a scintillation counter in the narrower sense of the definition. The two Japanese patent applications Nos. 52-95 715 and 52-30289 describe Cerenkov-glasses, i.e., materials likewise designed for proving the presence of fast particles, but by virtue of a different method (Cerenkov-effect). Japanese OS 44-14826 describes a low-fluorescent glass for a container which may be filled with a scintillating fluid; in other words, it is not itself a scintillation counter. GB-PS 905,391 describes a combination of scintillating material as a thin coating on a scintillation-free basic glass.

Glasses which are used for genuine scintillation-measuring operations are also known, e.g.:

(a) a high-$SiO_2$-containing glass with $Ce_2O_3$-contents in excess of 3% by weight produced by leaching out a phase-separated borosilicate glass using sugar as a reducing agent (GB-PS 869,055);

(b) a lithium-aluminum-silicate glass with 0.3 to 2% by weight of $Ce_2O_3$ produced in a reducing smelting process with carbon (U.S. Pat. No. 3,097,172);

(c) an alkali-aluminum-borate-glass with Ce added in the form of cerium oxalate as a reducing agent (U.S. Pat. No. 3,052,637);

(d) an alkali-aluminum-borate-glass with cerium oxide smelted in a reducing atmosphere (U.S. Pat. No. 3,032,428); and (e) an alkaline-earth silicate-glass with cerium oxide smelted under reducing conditions (JP-OS 81 05 344).

These glasses display the scintillation effect very well but they have the disadvantage that the ratio of cerium (IV) to cerium (III) which is required for scintillation is obtained by a reduction of the melt.

Such a reduction, whether obtained by means of oxalates, sugar or carbon, or by means of a reducing atmosphere, e.g., a forming gas, however, has a very serious drawback. Such glasses cannot be produced in noble-metal-smelting vessels because the metal, or precious metal alloy, corrodes. The alternative adoption of quartz- or ceramic crucibles, on the other hand, critically lowers production capability because smelting in a quartz crucible causes the material to dissolve, i.e., causes the formation of bubbles and schlieren in the production of larger castings.

SUMMARY OF THE INVENTION

It is the aim of the present invention to provide a novel scintillation glass.

It is another object to provide such a scintillator glass which is crystallization stable and which can be produced in large blocks (e.g., approximately 10-times the radiation length), in reproduceable optical quality in platinum crucibles substantially without reducing agents, i.e., substantially without oxalates, sugar, coal, metallic additives, etc., or reducing atmospheres such as, for example, forming gas atmospheres. It is possible to include in the glass batches of this invention from 0.1 to 1.5 wt. percent of a conventional reducing agent, which is not exhausted by fritting.

It is a further object of this invention to provide such a scintillator glass with good aptitude for use in the counting and detection of high energy particles.

Upon further study of the specification and appended claims, further objects and advantages of this invention will become apparent to those skilled in the art.

It has now been found that the above defined objects can be achieved by providing glasses having the following composition:

A colorless, cerium-and phosphorus-containing barium silicate glass, with a density $>3.3$ g/cm$^2$, a radiation length $<43.5$ mm, with strong fluorescence at 415-430 nm and with good scintillation properties, consisting essentially of (in percent by weight):

| | | |
|---|---|---|
| $SiO_2$ | 20-60 | |
| $B_2O_3$ | 0-18 | |
| $P_2O_5$ | 1-10 | } 21-60 |
| $Li_2O$ | 0-10 | |
| $Na_2O$ | 0-10 | |
| $K_2O$ | 0-15 | |
| MgO | 0-10 | |
| SrO | 0-12 | |
| BaO | 30-60 | |
| | | } 30-60 |
| $La_2O_3$ | 0-10 | |
| $Ce_2O_3$ | 0.5-8 | |
| Other oxides | 0-20. | |

Preferred scintillation-glasses consist essentially of (wt. %):

| | |
|---|---|
| $SiO_2$ | 25-55 |
| $B_2O_3$ | 0-12 |
| $P_2O_5$ | 1-7 |
| $Li_2O$ | 2-8 |
| $Na_2O$ | 0-8 |
| $K_2O$ | 2-10 |
| MgO | 2-8 |
| SrO | 0-10 |
| BaO | 30-60 |
| $La_2O_3$ | 0-8 |
| $Ce_2O_3$ | 0.5-6 |
| Other oxides | 0.25-18; | or of 25-50% $SiO_2$, at least 30% BaO, wherein $SiO_2$+BaO+$La_2O_3$=60-90%, and the ratio $SiO_2$:BaO is equal to or less than 1;

or are those wherein the ratio of $Ce_2O_3$ to $As_2O_3$ or $Sb_2O_3$ is greater than or equal to 1;

or wherein the combined amount of radiation-length-shortening oxides ZnO, $GeO_2$, SrO, $Gd_2O_3$, $Cs_2O$, $ZrO_2$, $Y_2O_3$ and $Nb_2O_5$ is 0 to 15 wt. %;

or wherein the combined amount of components which influence the UV-absorption edge $P_2O_5$, PbO, $SnO_2$, F and $Ce_2O_3$ is 1.6 to 8 wt. %, or wherein the combined amount of scintillation-improving sensitizers PbO, $Bi_2O_3$, $SnO_2$, $SO_3$ and $H_2O$ is 0.1 to 5 wt. %.

DETAILED DISCUSSION

The important data for characterizing an aptitude for counting and detecting high energy particles are the density and radiation length in the glass. The determination of maximum radiation length has been described for glasses in nuclear technology, e.g., by R. E. Bastic, "The Use of Glass in the Field of Atomic Energy", *J. Soc. Glass. Techn.* 42 1958, pages 705–835, which disclosure is incorporated by reference herein. The realization of both of these requirements, namely, that of a minimum possible radiation length with an absorption edge ($\lambda_{T}50$)<390 nm (10 nm sample thickness) and that for smeltability of the glass in platinum vessels depends vitally on the glass composition in respect of anions as well as cations. Furthermore, for reasons connected with continuous production methods and also because of the large dimensions of the glass blocks usually involved, crystallization stability is also an essential requirement which influences the choice of the glass composition. In this context the effect of even quite small amounts of $P_2O_5$ is of special significance. The $P_2O_5$ containing glasses can be produced with a viscosity of 450 dPa·s, whereas the glasses without small amounts of $P_2O_5$ have to be worked at viscosities of 200 dPa·s, and this results glasses of poor Schlieren-quality.

The criteria for good scintillation are, on the one hand, the presence of an absorption edge in the ultraviolet range and, on the other hand, the fluorescence capacity of these cerium-containing glasses. The stimulation for fluorescence is very strongly influenced by the absorption edge which should preferably be at $\leq 380$ nm. The measurements are taken at a stimulating wavelength of 372 nm. The fluorescence maximum is then usually found between 420 and 430 nm. In the comparisons with hitherto used glasses, peak-height x halfwidth is used as a criterion for fluorescence intensity.

It is known that the scintillation effect is best achieved with cerium oxide at a specific state of equilibrium between cerium III- and cerium IV which state is adjusted in the melt by application of a specific reduction-oxidation ratio. The preferred range of the ratio Cerium III to Cerium IV is greater than 2:1.

A simple means for estimating the degree of reduction, besides fluorescence intensity, is the grading of glass color. Tetra-valent cerium colors all glasses yellow-brown in accordance with its concentration. Lower valency-states leave the glass colorless. In other words, with constant cerium concentration in the glass, the color, or the absorption edge, provides a measure of the redox situation.

At Cerium III/Cerium IV ratios $<\frac{1}{2}$ the transmission is below 20% (400 nm, 25 mm); the yellow colour is unsatisfactory.

At Cerium III/Cerium IV ratios >2 the transmission is above 80% (400 nm, 25 mm); the colourless glass is satisfactory.

The glasses according to this invention can be smelted in platinum crucibles. They are colorless, have a density of more than 3.3 g/cm³, a radiation length of less than 43.5 mm, show strong fluorescence at 415–430 nm and have excellent scintillation properties.

The glasses according to this invention may further contain, by way of additional components, refining agents such as, for example, fluorides, chlorides, sulfates, $As_2O_3$, $Sb_2O_3$, etc.; scintillation sensitizers such as for example PbO, $SnO_2$, $SO_3$, etc. (see above); components which influence the UV absorption edge (see above) and which shorten radiation length (see above). All of these are included above under the general heading "other oxides". Fluorides, chlorides, sulfates, etc. can be added as salts with cations otherwise mentioned above or as S, etc.

Apart from the oxides mentioned above $Al_2O_3$ and CaO are particularly useful. They may be used in amounts 0–2 wt-% $Al_2O_3$ and 0–4 wt-% CaO.

The halids are important as refining agents, and for shifting the absorption edge to the UV-region. The $SO_4^{2-}$ or S doping is important for the intended Redox state in melts in platinum crucibles.

Unless indicated otherwise herein, all relevant definitions of various parameters and all methods of preparation are fully conventional and, e.g., are disclosed in the references cited in the Background section, especially Masaaki Kobayashi et al, *Nuclear Instruments and Methods* 184 (1981) 399–404, all of whose disclosures are incorporated by reference herein.

For example, for a typical glass according to this invention, the maximum radiation length (as $X_o$ or as 1) is calculated as follows:

A = atomic weight; $\rho$ = density
Z = atomic number
$X_o$ = [g/cm²]

$$l[mm] = \frac{X_o}{\rho} \quad \text{customary units for radiation length}$$

$$X_o = \frac{311.5\, A}{Z^2 \log \frac{183}{Z^{\frac{1}{3}}}}$$

for Si: $X_{Si}$=23.6 g/cm²;
for the following combination ($\rho$=3.48 g/cm³):

| Elements: | O | Si | Ba | Na | Li | P | Ce |
|---|---|---|---|---|---|---|---|
| Elements % (W) | 30.7 | 18.3 | 44.3 | 1.7 | 2.2 | 0.9 | 1.9 |
| W/$X_{Element}$ | 0.78 | 0.77 | 5.45 | 0.06 | 0.02 | 0.04 | 0.24 |
| $X_{Element}$ | 39.7 | 23.6 | 8.12 | 30.9 | 113.7 | 22.9 | 7.8 |

$$X_{Total} = \frac{\Sigma W}{\Sigma \frac{W}{X_{Elements}}} = \frac{100}{7.4} = 13.5 \text{ g/cm}^2$$

$$1 = \frac{X_{Total}}{\rho} = \frac{13.5}{3.48} = 38.7 \text{ mm}$$

In order to obtain a reference standard for the scintillation properties of the glasses according to this invention, the zero-impulse line spectrum (with cosmic ray radiation) was recorded in 30×30×10 mm samples without γ-source. Subsequently, a scintillation spectrum was recorded after 50 sec. of Co-60-irradiation. A 2 mm brass plate was inserted between radiation source and sample to eliminate interference by extraneous radiation. The comparable data of different samples were obtained after definition of the center of gravity of the impulse-line spectrum from the integrated overall distribution. The anode pulses of the photomultiplier were clipped by a 50 ns cable with a terminator and analyzed by a pulse height analyzer (255 channels). The center of gravity of the spectral curves corresponds to the compared scintillation values.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

Example

For 40 kg of glass:

| | |
|---|---|
| ground quartz | 16 800 g |
| aluminum hydroxide | 673 |
| phosphorous pentoxide | 400 |
| potassium carbonate | 1 180 |
| magnesium carbonate | 3 263 |
| lanthanum oxide | 1 800 |
| barium carbonate | 20 592 |
| lead (II) - oxide | 40 |
| bismuth (III) - oxide | 40 |
| arsenic (III) - oxide | 440 |
| cerium (III) - oxide | 400 |
| cerium (III) - oxalate | 332 |
| yttrium oxide | 400 |
| sulphur | 120 |
| potassium fluoride | 488 |

The homogenous mix is fritted at temperatures between 400° and 700° C. Fritting time may take up to several hours depending on the size of the individual portions. The fritted mix is smelted in small batches in a crucible of precious metal at temperatures between 1000° and 1150° C. Following subsequent refining for a few hours at temperatures between 1150° and 1250° C., the melt is homogenized with the aid of a precious-metal stirrer or agitator. The largely bubble- and schlieren-free melt is poured into a mold at about 1000° C. and tempered at about 540° C. in a cooling oven for 150 hours to cool evenly down to room temperature.

Glass according to this example composition and produced by the above mentioned steps of production achieve an appropriate ratio of Cerium III to Cerium IV $>2/1$.

The following Table 1 shows typical compositions according to the invention and their properties.

TABLE 1

| | 1 | 2 | 3 | 4 | 5 | 6 | 7 | 8 | 9 |
|---|---|---|---|---|---|---|---|---|---|
| $SiO_2$ | 29.1 | 32.0 | 42.0 | 34.8 | 27.5 | 27.5 | 29.5 | 30.2 | 31.5 |
| $B_2O_3$ | 8.9 | 2.0 | — | 3.1 | — | 11.0 | 10.4 | 8.5 | — |
| $Al_2O_3$ | — | — | 1.1 | 2.0 | — | — | — | — | 1.5 |
| $P_2O_5$ | 1.0 | 1.0 | 1.0 | 3.1 | 1.0 | 1.0 | 1.1 | 1.5 | 5.8 |
| $Li_2O$ | 2.5 | 2.1 | — | 5.2 | 0.2 | 2.5 | 2.0 | 1.0 | 1.2 |
| $Na_2O$ | 2.9 | 1.9 | — | — | 2.8 | 1.5 | 65 | 1.8 | — |
| $K_2O$ | — | — | 3.0 | 2.8 | — | — | — | — | — |
| $Cs_2O$ | — | — | — | — | — | — | — | 1.2 | — |
| MgO | 2.1 | — | 3.9 | 2.0 | — | 1.0 | 2.5 | 1.5 | — |
| CaO | — | 3.8 | — | — | — | — | 0.5 | — | — |
| SrO | — | — | — | — | — | 1.5 | 12.0 | — | 6.5 |
| BaO | 43.0 | 41.2 | 40.0 | 42.3 | 55.6 | 38.5 | 30.0 | 40.0 | 48.0 |
| ZnO | — | — | — | — | 7.4 | 1.5 | — | — | 0.5 |
| PbO | — | 0.1 | 0.1 | 0.4 | — | — | — | 0.5 | — |
| $Bi_2O_3$ | — | — | 0.1 | — | — | — | — | 0.5 | — |
| $SnO_2$ | — | — | 0.1 | — | — | 0.1 | — | 1.0 | — |
| $La_2O_3$ | 9.2 | — | 4.5 | — | — | — | — | 8.2 | 1.0 |
| $Gd_2O_3$ | — | 8.8 | — | — | — | — | — | 1.8 | — |
| $As_2O_3$ | 0.3 | 1.8 | 1.1 | 0.8 | — | 0.2 | 0.5 | — | — |
| $Sb_2O_3$ | — | — | — | — | — | — | — | — | — |
| $GeO_2$ | — | — | — | — | 2.0 | 1.5 | 1.5 | — | — |
| $ZrO_2$ | — | 0.2 | — | — | 1.9 | 5.0 | — | — | 1.1 |
| $Ce_2O_3$ | 1.0 | 2.5 | 1.5 | 1.5 | 1.1 | 1.2 | 2.0 | 1.00 | 1.8 |
| $Y_2O_3$ | — | — | 1.0 | — | — | 6.0 | 1.4 | — | — |
| $Nb_2O_5$ | — | 2.5 | — | — | — | — | — | — | — |
| F | — | — | 0.4 | — | 0.4 | — | — | — | — |
| $SO_3$ | — | 0.1 | 0.3 | 1.0 | — | — | — | 1.5 | 0.1 |
| $H_2O$ | — | — | — | — | 0.1 | — | 0.1 | 0.2 | — |
| $\rho$ (g/cm$^3$) | 3.32 | 3.49 | 3.47 | 3.41 | 4.13 | 3.52 | 3.32 | 3.56 | 3.67 |
| 1 mm | 36.9 | 31.0 | 36.5 | 38.2 | 26.2 | 36.3 | 41.4 | 32.6 | 31.3 |
| Scintillation* | 97 | 112 | 143 | 157 | 125 | 107 | 66 | 76 | 95 |
| Stimulation Max (nm) | 370 | 370 | 372 | 372 | 384 | 368 | 367 | 370 | 374 |
| Fluorescence Max (nm) | 415 | 415 | 420 | 415 | 425 | 410 | 418 | 415 | 420 |

*measured or described above

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. An essentially colorless, cerium- and phosphorous-containing barium silicate glass, of a density $>3.3$ g/cm$^2$, a radiation length $<43.5$ mm, with strong fluorescence at 415–430 nm and with good scintillation properties, consisting essentially of (in percent by weight):

| | |
|---|---|
| $SiO_2$ | 20–60 ⎫ |
| $B_2O_3$ | 0–18 ⎬ 21–60 |
| $P_2O_5$ | 1–10 ⎭ |
| $Li_2O$ | 0–10 |
| $Na_2O$ | 0–10 |
| $K_2O$ | 0–15 |
| MgO | 0–10 |
| SrO | 0–12 |
| BaO | 30–60 ⎫ |
| $La_2O_3$ | 0–10 ⎬ 30–60 |
| $Ce_2O_3$ | 0.5–8 ⎭ |
| (a) other oxides which are radiation-length shortening oxides | |
| (b) refining agents | 0–20 |
| (c) other oxides which are UV-absorption edge adjusting oxides | |
| (d) other conventional components which are scintillating sensitizers, | |
| $Al_2O_3$ | 0–2 |
| CaO | 0–4. |

2. A scintillation glass of claim 1, consisting essentially of (wt. %):

| | |
|---|---|
| $SiO_2$ | 25–55 |

-continued

| | |
|---|---|
| $B_2O_3$ | 0-12 |
| $P_2O_5$ | 1-7 |
| $Li_2O$ | 2-8 |
| $Na_2O$ | 0-8 |
| $K_2O$ | 2-10 |
| $MgO$ | 2-8 |
| $SrO$ | 0-10 |
| $BaO$ | 30-60 |
| $La_2O_3$ | 0-8 |
| $Ce_2O_3$ | 0.5-6 | other components (a)-(d) 0.25-18.

3. A scintillation glass of claim 1, containing 25-50% of $SiO_2$ and at least 30% of $BaO$, wherein the amount of $SiO_2+BaO+La_2O_3=60-90\%$, and the weight ratio of $SiO_2$: $BaO$ is equal to or less than 1.

4. A scintillation glass of claim 1, comprising a refining agent which is $As_2O_3$ or $Sb_2O_3$ and wherein the weight ratio of $Ce_2O_3$ to $As_2O_3$ or $Sb_2O_3$ is greater than or equal to 1.

5. A scintillation glass of claim 1, wherein the radiation-length-shortening oxides are $ZnO$, $GeO_2$, $SrO$, $Gd_2O_3$, $Cs_2O$, $ZrO_2$, $Y_2O_3$ or $Nb_2O_5$ and the total amount thereof is 0 to 15 wt. %.

6. A scintillation glass of claim 1, wherein the oxides which influence the UV-absorption edge are $P_2O_5$, $PbO$, $SnO_2$, F or $Ce_2O_3$ and the total amount thereof is 1.6 to 8 wt. %.

7. A scintillation glass of claim 1, wherein the scintillation sensitizers are $PbO$, $Bi_2O_3$, $SnO_2$, $SO_3$ or $H_2O$ and the total amount thereof is 0. to 5%.

8. A scintillation glass of claim 1, wherein the refining agents are fluorides, chlorides, sulfates, $Sb_2O_3$ or $As_2O_3$.

9. A scintillation glass of claim 1, wherein the oxides (a) are $ZnO$, $GeO_2$, $SrO$, $Gd_2O_3$, $Cs_2O$, $ZrO_2$, $Y_2O_3$ or $Nb_2O_5$; the refining agents (b) are fluorides, chlorides, sulfates, $Sb_2O_3$ or $As_2O_3$; the oxides (c) are $P_2O_5$, $PbO$, $SnO_2$, F or $Ce_2O_3$; and the sensitizers (d) are $PbO$, $Bi_2O_3$, $SnO_2$, $SO_3$ or $H_2O$.

* * * * *